（12） United States Patent
Scarbrough, Jr.

(10) Patent No.: US 9,789,575 B2
(45) Date of Patent: Oct. 17, 2017

(54) ROTOR V-BLOCK FIXTURE AND METHOD

(71) Applicant: Toyota Motor Engineering & Manufacturing North America, Inc., Erlanger, KY (US)

(72) Inventor: Carl E. Scarbrough, Jr., Georgetown, KY (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 123 days.

(21) Appl. No.: 14/448,690

(22) Filed: Jul. 31, 2014

(65) Prior Publication Data
US 2016/0031053 A1 Feb. 4, 2016

(51) Int. Cl.
B23Q 3/06 (2006.01)
B23Q 3/10 (2006.01)

(52) U.S. Cl.
CPC .............. B23Q 3/104 (2013.01); B23Q 3/062 (2013.01); B23Q 3/10 (2013.01); B23Q 3/102 (2013.01); B23Q 3/105 (2013.01); Y10T 29/49998 (2015.01); Y10T 29/50 (2015.01); Y10T 29/505 (2015.01)

(58) Field of Classification Search
CPC .......... B23Q 3/062; B23Q 3/104; B23Q 3/10; B23Q 3/105; B23Q 3/102; Y10T 29/49998; Y10T 29/50; Y10T 29/505
USPC ........ 29/559, 560, 560.1; 269/902, 289 MR, 269/55, 271
See application file for complete search history.

(56) References Cited

U.S. PATENT DOCUMENTS

| 2,396,450 | A |   | 3/1946 | Walling |           |
|-----------|---|---|--------|---------|-----------|
| 3,218,059 | A | * | 11/1965 | Andrew | B23Q 3/104 |
|           |   |   |        |         | 269/271   |
| 3,423,885 | A | * | 1/1969 | Crandall | B23Q 3/104 |
|           |   |   |        |         | 269/902   |
| 3,463,478 | A |   | 8/1969 | Hennessey |         |
| 4,151,984 | A |   | 5/1979 | Zapart  |           |
| 4,221,391 | A |   | 9/1980 | Dutton  |           |

(Continued)

FOREIGN PATENT DOCUMENTS

CN 201783839 U 4/2011

Primary Examiner — Christopher Besler
Assistant Examiner — Bayan Salone
(74) Attorney, Agent, or Firm — Christopher G. Darrow; Darrow Mustafa PC

(57) ABSTRACT

A mechanism retains an asymmetric work piece in a fixed orientation during a machining process on diversely positioned surfaces falling on multiple work piece axes. The mechanism includes a body having an upper surface forming an elongated V-shaped groove, a planar lower surface spaced from the upper surface, and a through passage extending between the upper and lower surfaces. A fastener includes an elongated shaft which extends within said passage, and has an upper end emerging within the V-shaped groove for engaging the work piece, and a lower end extending below and configured to abut the lower surface to maintain the shaft under tensile loading. A plurality of discrete mechanisms can be commonly mounted on a machining table in a spaced-apart relationship with the V-shaped grooves in axial alignment to support a single super elongated work piece. The fastener can be axially advanced or retarded to vary tensile loading.

22 Claims, 4 Drawing Sheets

(56) References Cited

U.S. PATENT DOCUMENTS

| | | | |
|---|---|---|---|
| 4,445,678 A * | 5/1984 | George | B23Q 3/104 269/282 |
| 4,854,568 A | 8/1989 | Baeza et al. | |
| 6,152,435 A | 11/2000 | Snell | |
| 6,247,690 B1 | 6/2001 | Wolf | |
| 6,254,077 B1 * | 7/2001 | Riley, Jr. | B25B 5/10 269/156 |
| 6,444,941 B1 | 9/2002 | Russo | |
| 6,554,265 B2 | 4/2003 | Andronica | |
| 7,314,215 B2 * | 1/2008 | Vosoughkia | B23Q 3/104 269/296 |
| 7,331,097 B2 * | 2/2008 | Stone | H01L 21/67103 165/80.1 |

\* cited by examiner

ROTOR V-BLOCK FIXTURE AND METHOD

TECHNICAL FIELD

The present disclosure relates to work holding devices employed in manufacturing processes in general and to V-block type work holding devices employed in manufacturing processes in particular.

BACKGROUND

V-block type work holding devices have been employed in the machine tool industry for more than a century. They are typically employed for holding parts for machining or inspection. Typically, an elongated "V" groove configuration is machined or ground centrally in a block which has a provision for accommodating a horse shoe style clamp to secure the work piece within a V-groove. More advanced designs enable the V-block to be held on up to five sides. Nevertheless, the prior art suffers from numerous shortcomings which include low holding/clamping strength, marred work pieces, deformed fasteners/guides, a large profile interfering with associated machine tools, and a generalized lack of versatility.

One known V-fixture provides a "strap" device for securing a work piece in an inverted orientation. The strap itself is secured by screws into threaded lands on either side of the V-groove. The relative inaccessibility of the work piece in this type of jig limits the cutting tool to cross-drilling applications. Another V-fixture features a V-block having a tangent contact drill guide being vertically adjustable by legs straddling either side of the V-block. Screws on either side of the V-block secure the position. This prevents turning the V-block on its side for additional operations. Additionally, the straps cannot exert any significant clamping force on the work piece by the nature of its design.

Another V-block configuration employs threaded holes on the lands on either side of the V-block to secure and position a V-shaped work holding clamp. The threads do not extend through the V-block and limit work holding to the V-shaped cavity. Additionally, the clamp has a high profile which may interfere with machining operations. Furthermore, small diameter work pieces are located at the bottom of the V-shaped cavity, making it even less accessible to a cutting tool. Also, the mechanism will not permit the V-block to be held on the clamping side.

A similar device features a block having a single central V-shaped cavity and a flat base with threaded holes in lands adjacent to the V-shaped cavity. The ends of an "I" shaped tangent plate are secured to the V-block. A liner is disposed within the V-shaped cavity. This design lacks guide pins secured in the tangent clamp plate or a counter bore feature to recess the securing screws permitting turning of the fixture on any side. Additionally, the threaded holes are not threaded completely through the V-block, which limits the tool to holding the work within the V-shaped cavity.

Yet another device includes a universal angle self-adjusting V-block work piece holder including a rectangular base supporting two separate upright inverted W's that run parallel to each other along the longer sides of the rectangular base. A channel of constant width runs laterally between the two opposing vertically positioned W's. Four holes located at the apex of each peak are used as insertion points for two hexagonal screws with smooth cylindrical shafts. These shafts provide a sufficient axle for rotation of the pivoting panels to which they are attached from a through aperture extending from a ridge at the bottom of each panel. The extending portions of the separated pivotal panels are thin enough to slip between the lateral channel, and swivel when attached between the two vertical walls by the cylinder shafts. Each panel is therefore allowed movement independent of the other. Thus, the holder supports a work piece at a variety of predetermined angular orientations during the machining process.

SUMMARY

The present disclosure describes a compact V-block fixture configured to precisely locate and hold a complex shaped, asymmetrical work piece such as a rotor die part for machining about virtually the entire peripheral outer surface of the work piece without having to re-set the work piece with the V-block fixture midway through the machining process. In application, the V-block fixture is bolted to a machining table and the work piece is non-adjustably bolted to the V-block fixture from below whereby the fastener(s) is/are not exposed and does/do not interfere with the machining process. The compact nature of the V-block fixture provides substantially 360° circumferential access clearance for machining the work piece. The work piece is non-adjustably bolted to the V-block fixture to ensure unit-to-unit repeatability.

According to an embodiment of the disclosure, a mechanism for retaining a work piece in a fixed orientation during a machining process on diversely positioned surfaces falling on multiple work piece axes includes a body portion having an upper surface with an elongated V-shaped groove formed therein, a planar lower surface spaced from the upper surface, and a through passage extending between the upper and lower surfaces. A fastener portion includes an elongated shaft disposed within the through passage having an upper end emerging within the V-shaped groove and configured to engage a work piece aligned therewith and a lower end extending below and configured to abut the lower surface and to maintain the elongated shaft under tensile loading.

According to another embodiment of the disclosure, a mechanism for retaining an elongated work piece in a fixed orientation during a machining process on diversely positioned surfaces falling on multiple work piece axes includes two or more longitudinally spaced apart V-block fixtures commonly affixed to a machining table, each including a fastener portion having an upper end separately engaging a work piece at spaced points there along.

According to yet another embodiment of the disclosure, a method for retaining a work piece in a fixed orientation during a machining process on diversely positioned surfaces falling on multiple work piece axes, includes the steps of providing a body portion of a V-block fixture having an upper surface with an elongated V-shaped groove formed therein, a planar lower surface spaced from the upper surface, and a through passage extending between the upper and lower surfaces, providing a fastener portion of a V-block fixture including an elongated shaft disposed within the through passage, wherein the elongated shaft has an upper end emerging within the V-shaped groove and is configured to engage a work piece aligned therewith and a lower end extending below and configured to abut the lower surface and to maintain the elongated shaft under tensile loading. The method further includes the steps providing a work piece with an outwardly opening recess formed therein, aligning the work piece with the V-shaped groove, aligning the work piece outwardly opening recess with the upper end of the elongated shaft, and extending the upper end of the elongated shaft within said outwardly opening recess to establish engagement there between and to establish/maintain tensile loading of the shaft.

These and other features and advantages of the disclosure will become apparent upon reading the following specification, which, along with the drawings, describes alternative embodiments of the disclosure in detail.

BRIEF DESCRIPTION OF THE DRAWINGS

The present apparatus will now be described, by way of example, with reference to the accompanying drawings, in which.

Figure 1:
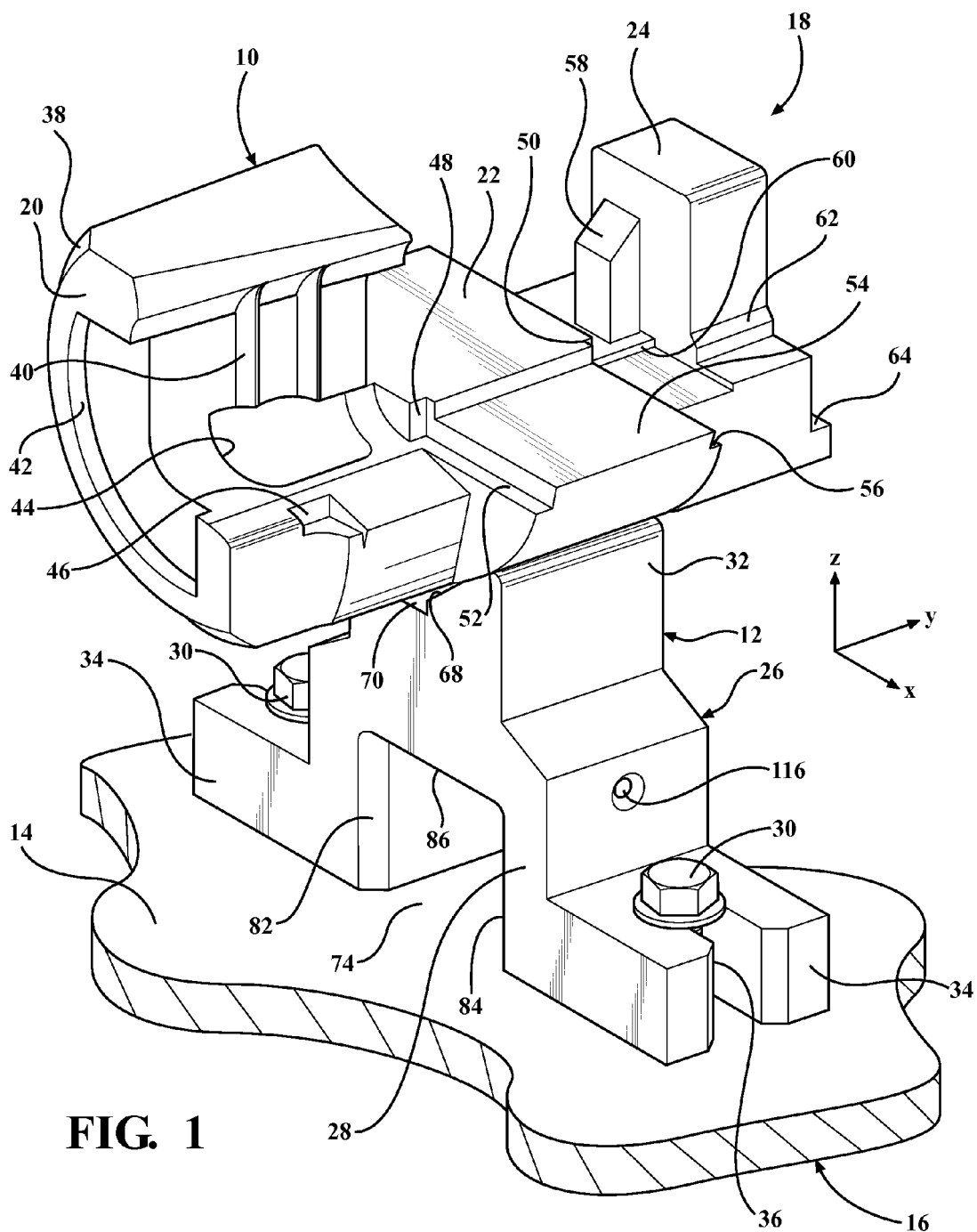
FIG. 1 is perspective view of a rotor V-block secured to a machine table and supporting a complex shaped work piece (e.g., rotor die)

Although the drawings represent embodiments of the present apparatus and method, the drawings are not necessarily to scale and certain features may be exaggerated in order to illustrate and explain the present disclosure. The exemplification set forth herein illustrates embodiments of the apparatus and method, in varied forms, and such exemplification is not to be construed as limiting the scope of the present apparatus and method in any manner.

DETAILED DESCRIPTION

In the following Detailed Description, reference is made to the accompanying drawings, which form a part thereof, and in which is shown by way of illustration specific embodiments in which the disclosure may be practiced. In this regard, directional terminology, such as "top", "bottom", "front", "back", "leading", "trailing", etc. is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present disclosure. Furthermore, the axes (e.g., ±X, ±Y, and ±Z axes) are referenced on the drawings to provide a relative directional sense only. The following detailed description, therefore, is not to be taken in a limiting sense, and the scope of the present disclosure is defined by the appended claims.

The present disclosure describes a compact V-block fixture, formed of hardened tool steel and configured to precisely locate and hold a rotor die part for machining. In application, the V-block fixture is bolted to a machine table and the rotor die part is bolted to the V-block fixture. The compact nature of the V-block fixture provides access clearance for machining the rotor die part without repositioning or resetting it on the V-block fixture during the machining process. The rotor die part is non-adjustably bolted to the V-block fixture to ensure unit-to-unit repeatability.

The compact V-block fixture of the present disclosure serves to locate the rotor die part in a planned location for part setup. The design specifications of the rotor die part define the precise location of the V-block fixture within the host computer aided design (e.g., cad) system. The "cutter line" creator also includes the V-block fixture and rotor die part in the cad system to check for potential machining collisions (e.g., interferences). This permits positioning of the fixture to ensure adequate clearance of machining of the rotor die part.

Previous fixtures tended to be too large for smaller parts and did not provide a specified planned location for part setup. Such fixtures lacked adequate clearance for the machining process. Slotted bolt holes in the fixture employed for clamping the part to the fixture permitted a range of locations, frequently resulting in piece to piece variances. The present disclosure is substantially more compact and allows ample clearance for machining all of the critical diversely positioned surfaces of the rotor die part falling on multiple work piece axes with a single setup. A precise line-to-line slip-fit of the fastener (e.g., bolt) within a host retainer passageway ensures overall precision in the machining process.

Referring to FIG. 1, a rotor die part (e.g., work piece) 10 is illustrated mounted to a V-block fixture (e.g., retaining mechanism) 12 which, in turn, is mounted to a planar surface 14 of a machining table 16. The overall assembly is identified by reference numeral 18.

The rotor die part 10 includes an active die portion 20, a mid-portion 22 and a base portion 24 arranged in an elongated configuration along longitudinal axis Y (e.g., a first principle axis). The rotor die part 10 has a complex shape which is asymmetrical in all three principle axes (e.g., X, Y and Z axes) and forms varied irregular surfaces which can only be accessed, for machining purposes, along one of said principle axes or an intermediate (e.g., offset vector intermediate the X and Y axes, the X and Z axes, the Y and Z axes or the X, Y and Z axes). The rotor die part 10 is preferably monolithically formed from a single piece of hardened steel. The V-block fixture 12 includes a body portion 26 preferably monolithically formed from a single piece of D2 tool steel material (i.e., a discrete body portion) which has been fully hardened. The body portion 26 of the V-block fixture 12 includes a base portion 28 affixed to the machining table 16 by a pair of threaded fasteners (e.g., bolts and nuts) 30, or other suitable fasteners, and an upper portion 32 extending vertically from the base portion 28 along vertical axis Z. Base portion 28 forms an opposed pair of laterally extending cooperating feet 34. Each foot 34 has a slot 36 for receiving the shank of a respective threaded fastener 30.

For purposes of providing non-limiting definition and to enable clear understanding of the present disclosure, "longitudinal" means parallel to the direction of the Y axis, "lateral" means parallel to the direction of the X axis, and "vertical" means parallel to the direction of the Z axis.

The rotor die part 10 has a number of diversely positioned surfaces which fall on or transect multiple axes. By way of example, the active die portion 20 of the rotor die part 10 has an asymmetrical outer surface detail 38 in the form of a circumferentially segmented, tapered cone converging longitudinally along the −Y axis. Furthermore, the active die portion 20 of the rotor die part 10 has a number of complex, irregularly shaped details 40, 42, 44, and 46, each requiring precision machining and surface finishing. Also, the mid-portion 22 of the rotor die part 10 has a number of complex, irregularly shaped details 48, 50, 52, 54, 56 and 58, each requiring precision machining and surface finishing. Similarly, the base portion 24 of the rotor die part 10 has a number of complex, irregularly shaped details 58, 60, 62 and 64, each requiring precision machining and surface finishing. The details 38-64 highlighted herein are merely examples.

Although a multi-axis milling machine is capable of being programmed to fabricate each of the individual details 38-64 et seq separately, doing so with a single rotor die part 10-V-block fixture 12 setup was heretofore not practical. The compact structure of the V-block fixture 12, particularly its relatively small dimension in the longitudinal direction (e.g., Y axis), exposes all of the details 38-64 to a machine tool head (not illustrated) without risking contact between the V-block fixture 12 and the machine tool head during the machining process. Restated, all external surface areas (e.g., details 38-64) of the rotor die part 10 are accessible to a cutting head of a multi-axis milling machine approaching the rotor die part 10 along one or a combination of the ±X, ±Y and ±Z axes, without interfering with the V-block fixture 12.

Figure 2:
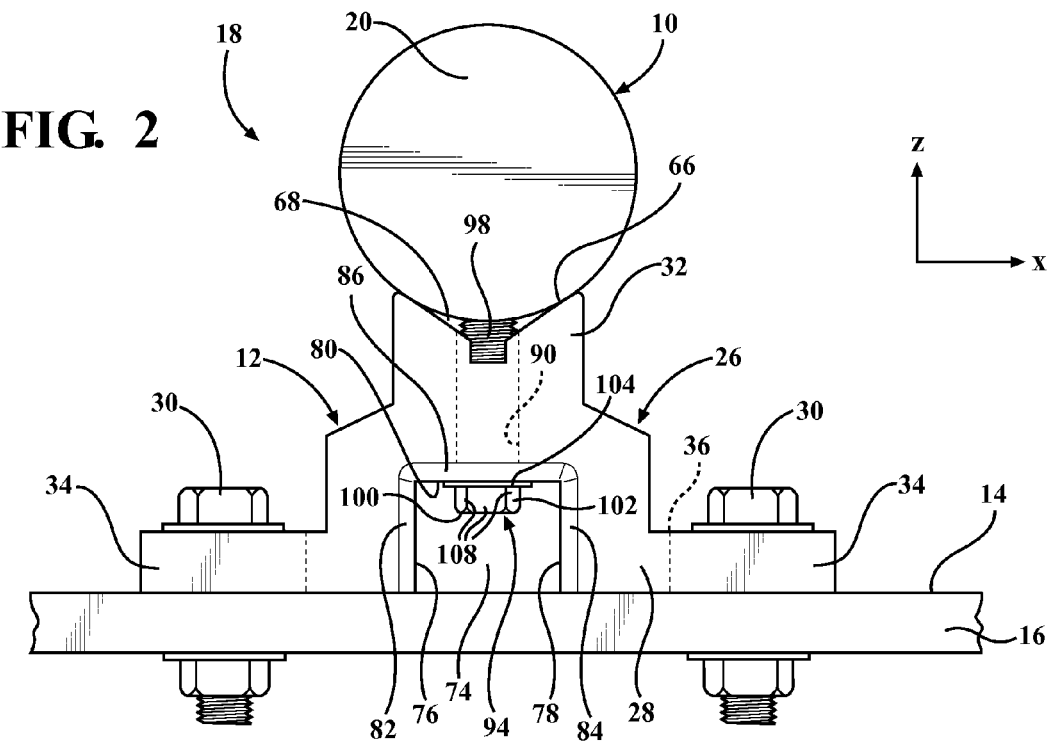
FIG. 2 is a broken end plan view of the V-block, machine table and work piece of FIG. 1, wherein the outer surface envelope of the work piece is simplified.
Figure 3:
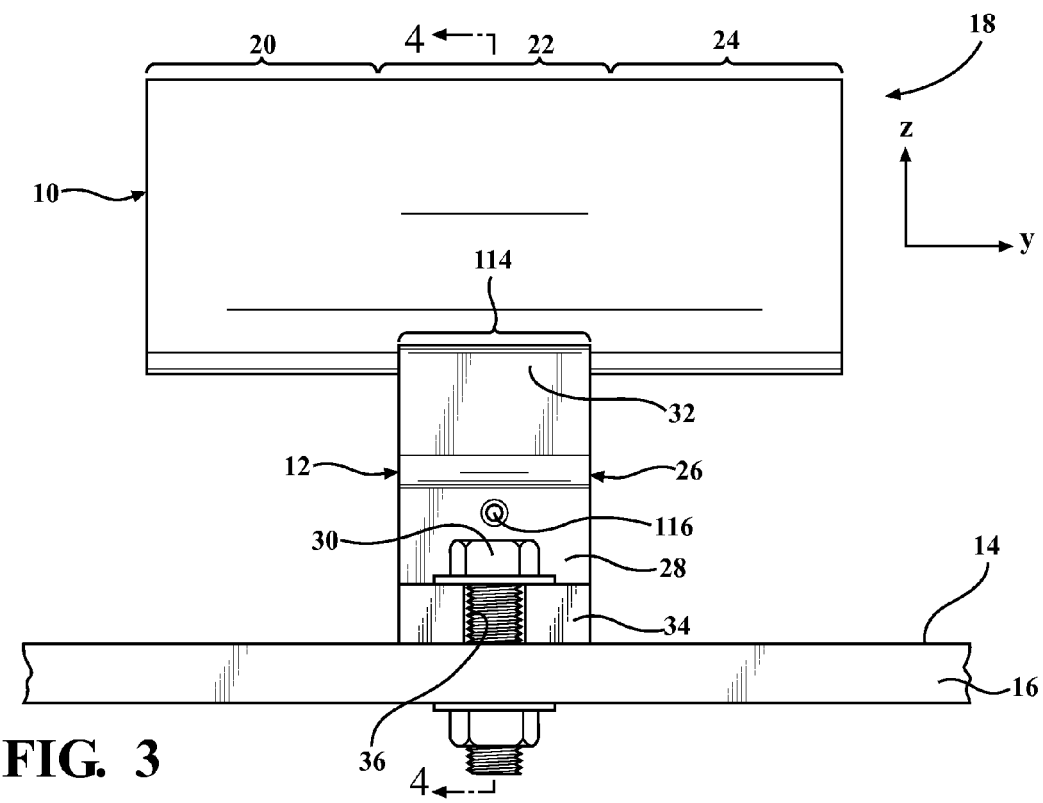
FIG. 3 is a broken side plan view of the V-block, machine table and work piece of FIG. 1, wherein the outer surface envelope of the work piece is simplified.
Figure 4:
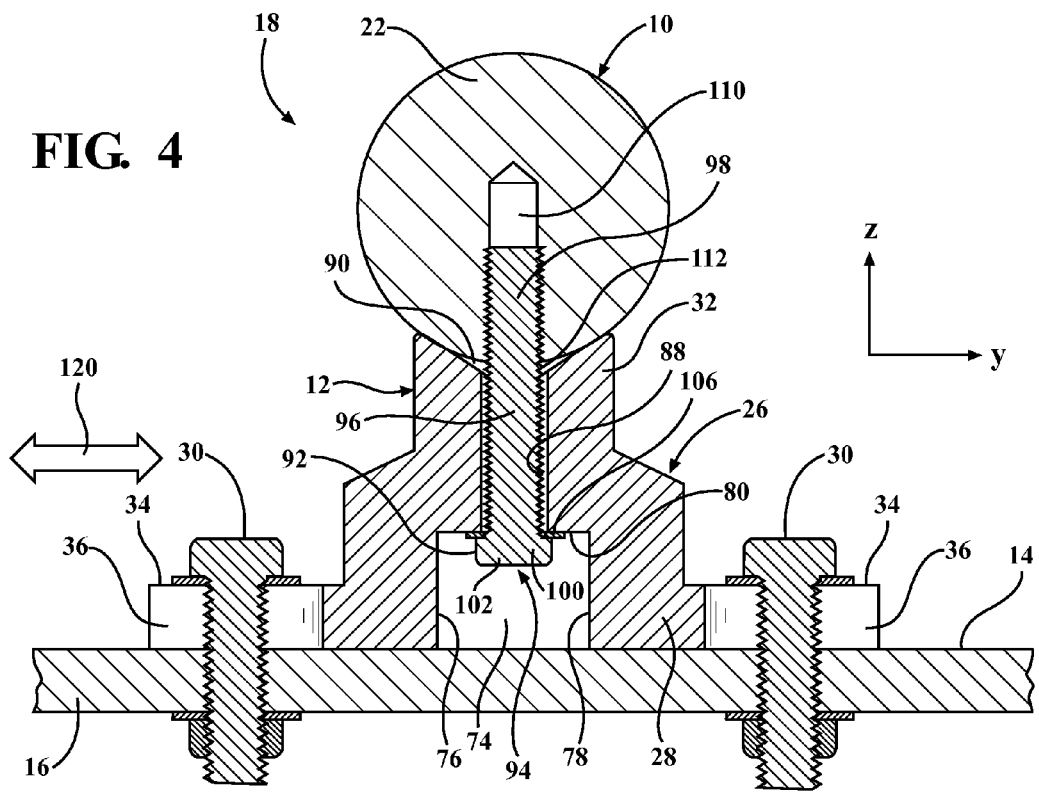
FIG. 4 is a cross-sectional view of the assembled V-block, machine table and work piece of FIG. 2 taken along line 4-4 of FIG. 3.
Figure 5:
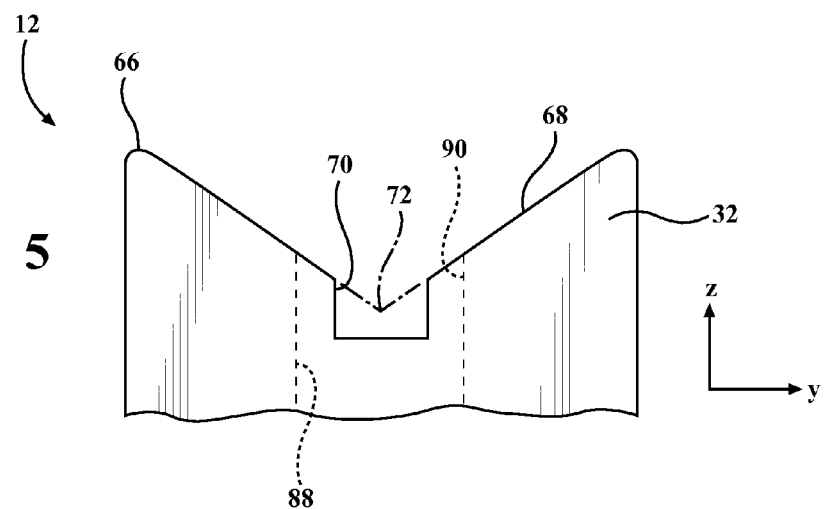
FIG. 5 is a broken, end plan view of the V-groove portion of the V-block of FIG. 2 illustrating selected details on an enlarged scale.

Referring to FIGS. 2, 3, 4 and 5, the assembly 18 of FIG. 1 is depicted in varying perspectives, and is identical in all material respects to the assembly 18 of FIG. 1, with the sole exception that the rotor die part 10 in FIGS. 2, 3 and 4 is illustrated as a simple solid cylinder, for the sake of simplicity. By definition, the rotor die part 10 is configured along a first principle axis extending parallel to the Y axis, a second principle axis extending parallel to the X axis and a third principle axis extending parallel to the Z axis. As illustrated in FIGS. 2, 3, 4 and 5, the rotor die part 10 is elongated along the first principle axis.

As best seen in FIG. 3, the mid-portion 22 of the rotor die part 10 is longitudinally and laterally centered over the V-block fixture 12, with the active die portion 20 of the rotor die part 10 extending, in cantilever fashion, along the −Y axis, and the base portion 24 of the rotor die part 10 extending, in cantilever fashion, along the +Y axis. Although the rotor die part 10 is depicted with the center of mass/geometrical center aligned with the vertical axis Z, it is contemplated that the rotor die part 10 can be mounted to the V-block fixture 12 geometrically offset along the ±Y axis. Furthermore, the designation of the rotor die part 10 as including an active die portion 20, a mid-portion 22 and a base portion 24 is considered as arbitrary and included herein for the sake of clarity only. For example, it is contemplated that the entire axial (e.g., Y axis) length of the rotor die part 10 can function as an active die portion. Accordingly, the designation of the rotor die part 10 as including an active die portion 20, a mid-portion 22 and a base portion 24 is not to be considered as limiting.

The body portion 26 of the V-block fixture 12 defines an upper surface 66 with an elongated V-shaped groove 68 formed therein oriented along the Y axis. A generally rectangular elongated recess 70 is formed along the nadir 72 of the V-shaped groove 68 also extends along the Y axis. The rectangular elongated recess 70 aligned with the nadir 72 of the V-shaped groove 68 ensures a localized clearance from the rotor die part 10 and enables removal of any chaff and cutting oil accumulated during the machining process.

A generally rectangular longitudinally directed opening 74 extends through the base portion 28 of body portion 26 of the V-block fixture 12 laterally intermediate the two feet 34 and centered beneath the nadir 72 of the V-shaped groove 68. The longitudinal opening 74 defines opposed side walls 76 and 78 and a ceiling (e.g., planar lower surface) 80 transitioning at each longitudinal end thereof in stress-relieving bevels 82, 84 and 86, respectively.

The ceiling 80 is vertically spaced below the upper surface 66 of the upper portion 32 of the V-block fixture 12. A vertically extending through passage 88 extends between the ceiling 80 and the upper surface 66, having an upper opening 90 centered longitudinally and laterally with both the V-shaped groove 68 and the elongated recess 70. The vertically extending through passage 88 has a lower opening 92 centered longitudinally and laterally with the ceiling (e.g., lower surface) 80.

As best illustrated in FIGS. 2 and 4, a fastener portion 94 of the V-block fixture 12 includes an elongated shaft 96 disposed within the through passage 88, preferably in a slip-fit relationship. The fastener portion 94 is preferably monolithically formed from a single (i.e., discrete) piece of fully hardened steel. The elongated shaft 96 has an upper end 98 emerging through the upper opening 90 and extending into the V-shaped groove 68. The elongated shaft 96 has a lower end 100 emerging through the lower opening 92 and extending into the longitudinal opening 74 in the base portion 28 of the body portion 26 of the V-block fixture 12. The lower end 100 of the fastener portion 94 terminates in an enlarged head portion 102 forming a thrust surface 104 on an upper surface thereof bearing against the ceiling 80 through an intermediate washer/bushing 106. This structure constitutes an adjustable abutment feature. The enlarged head portion 102 forms engagement surfaces 108, such as hexagonally arranged flats, adapted for cooperating engagement with a tool (e.g., hand tool) to apply torque to the fastener portion 94. In the embodiment illustrated herein, the fastener portion 94 essentially constitutes a bolt having external threads extending along its shank formed of fully hardened tool steel. The through passage 88 is illustrated as being tubular in shape with a smooth i.d. (e.g., inside diameter) surface dimensioned in a slip-fit relationship with the threaded shank of the bolt. It is further contemplated that two or more fastener portions 94 can be employed with a single V-block fixture 12.

Alternatively, the fastener portion 94 of the V-block fixture 12 can constitute an elongated shaft 96 with external threads formed at the upper end 98 configured to engage mating threads formed in the blind bore 110 in the rotor die part 10 and external threads formed at the lower end 100 for receiving a mating nut/thrust washer combination for bearing against the ceiling 80 of the longitudinal opening 74 of the base portion 28 of the body portion 26 of the V-block fixture 12 to establish tensile loading of the shaft. This alternative configuration essentially constitutes a threaded stud.

As best illustrated in FIGS. 3 and 4, the upper end 98 of the elongated shaft 96 of the fastener portion 94 extends vertically above the upper surface 66 of the V-block fixture 12. The rotor die part 10 has an internally threaded blind bore 110 externally accessible through an opening 112 in a preformed region 114 of a peripheral outer surface of the mid-portion 22 of the rotor die part 10. The preformed region 114 is shaped to nest within the V-shaped groove 68 of V-block fixture 12 ensuring intimate line-to-line or surface-to-surface contact between the outer peripheral surface of the rotor die part 10 and the upper surface 66 of the V-block fixture 12.

The longitudinal opening 74 in the base portion 28 of the body portion 26 of the V-block fixture 12 provides external access to the enlarged head portion 102 of the fastener portion 94 of the V-block fixture 12 via a suitable tool, such as a hand wrench, for assembling and disassembling the V-block fixture 12-rotor die part 10-machining table 16 construct and increasing/decreasing the tensile loading of the elongated shaft 96 of the fastener portion 94 insitu (i.e., in a fully assembled condition).

As best illustrated in FIGS. 1 and 3, the body portion 26 of the V-block fixture 12 includes a number (e.g., an opposed pair) of threaded blind bores 116 (only one is illustrated), each configured to releasably receive a lift point attachment such as an O-ring. Multiple symmetrically distributed lift points about the center of mass of the V-block fixture 12, either alone or in combination with the rotor die part 10 enable precision lifting, horizontal translation and placement, such as with an overhead hoist, without creating swaying or angular/off axis perturbations.

The method of the present disclosure is employed by selecting/designing a blank for the rotor die part 10 having a mid-portion 22 with a preformed region 114 suitable for mounting on the V-block fixture 12. Next, the threaded blind bore 110 is formed in the preformed region 114. The preformed region 114 of the rotor die part 10 blank is then nested within the V-shaped groove 68 of the V-block fixture 12 with the through passage 88 of the V-block fixture 12 axially aligned with the threaded blind bore 110 of the rotor die part 10 blank.

The elongated shaft 96 of the fastener portion 94 of the V-block fixture 12 is then advanced axially until the external threads of the elongated shaft 96 engage the internal threads of the blind bore 110. A tool (not illustrated) then applies torque to the enlarged head portion 102 of the fastener portion 94 of the V-block fixture 12, causing the fastener portion 94 to advance axially until the thrust surface 104 of the enlarged head portion 102 abuts the ceiling 80 of the base portion 28 of the body portion 26 of the V-block fixture 12. Additional torque is then applied to the enlarged head portion 102 until a predetermined tensile level is established in the elongated shaft 96 of the fastener portion 94 of the V-block fixture 12.

In a separate step, the V-block fixture 12, alone or with the rotor die part 10 pre-mounted thereto, is securely affixed to the associated machining table 16 using the threaded fasteners 30. Once the feet 34 of the V-block fixture 12 are pre-positioned on the planar surface 14 of the machining table 16, the V-block fixture 12 can be positionally adjusted along the Y axis, as indicated by arrow 120, placing the V-block fixture 12 in a final design-intent position. Lastly, the V-block fixture 12 is affixed to the machining table 16 by the threaded fasteners 30 or other suitable devices.

Once mounted, machining of the entire exposed outer surface of the rotor die part 10, with the sole exception of the preformed region 114, including all details 30-64 can inter alia take place without the need for interim repositioning of the rotor die part 10.

Figure 6:
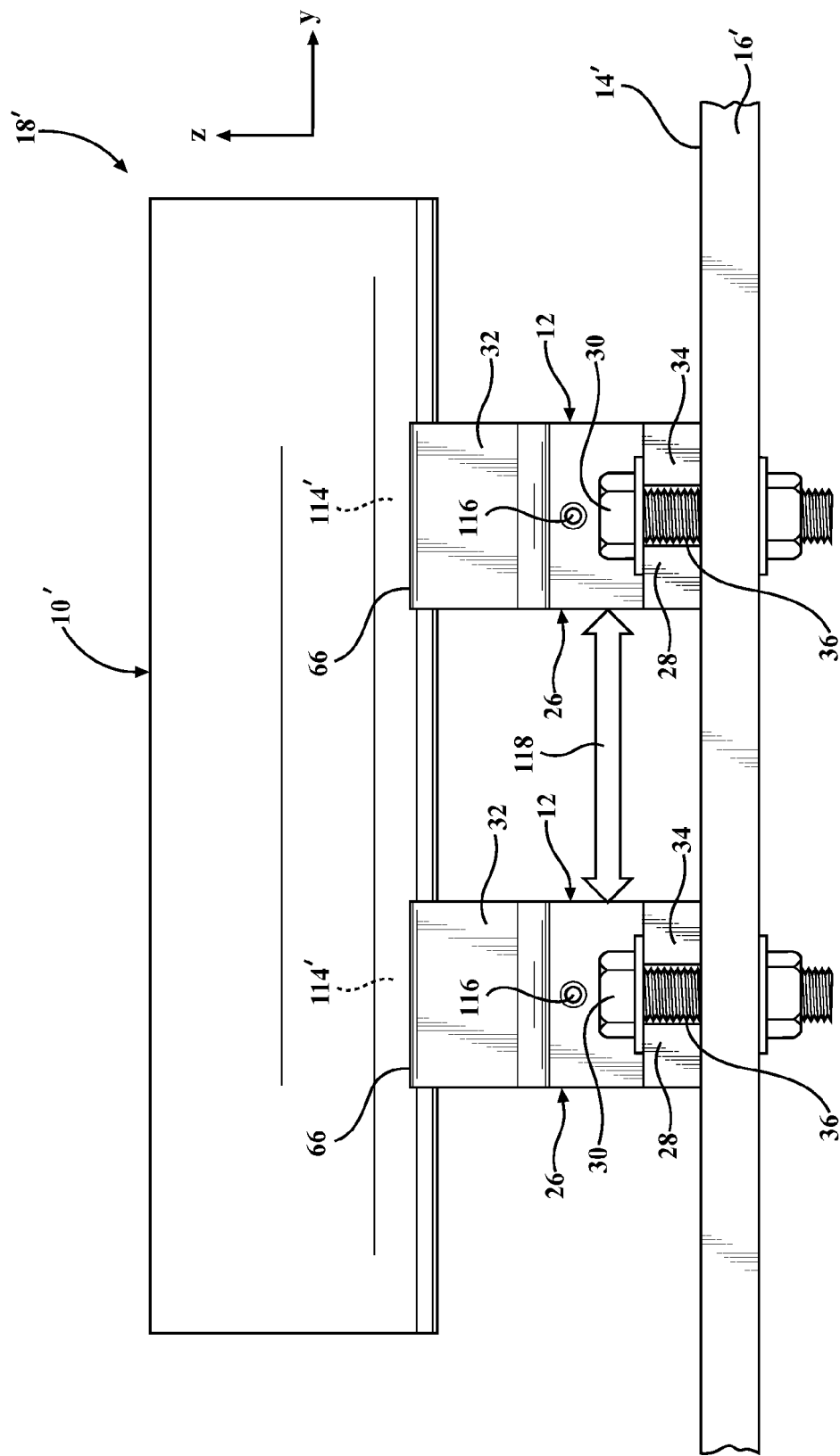
FIG. 6 is a broken side plan view of an assembled V-block, machine table and work piece similar to FIG. 3, wherein multiple (e.g., two) similar spaced-apart V-blocks are simultaneously employed to secure a single super elongated work piece.

Referring to FIG. 6, an elongated rotor die part (e.g., work piece) 10' is illustrated mounted to a pair of V-block fixtures (e.g., retaining mechanisms) 12 which, in turn, are mounted to a planar surface 14' of a common machining table 16'. The overall assembly is identified by reference numeral 18', and is identical in all material respects to the embodiment described in connection with FIGS. 1-5, unless described otherwise.

The pair of V-block fixtures 12 are longitudinally spaced apart, as indicated by an arrow 118, sufficiently to ensure machining of the entire exposed outer surface of the rotor die part 10', with the sole exception of the preformed regions 114' associated with the two V-block fixtures 12, without the need for interim repositioning of the rotor die part 10'.

It is to be understood that the present apparatus and method has been described with reference to specific embodiments and variations to provide the features and advantages previously described and that the embodiments are susceptible of modification as will be apparent to those skilled in the art.

Furthermore, it is contemplated that many alternative, common inexpensive materials can be employed to construct the basis constituent components. Accordingly, the forgoing is not to be construed in a limiting sense.

The present apparatus and method has been described in an illustrative manner, and it is to be understood that the terminology, which has been used is intended to be in the nature of words of description rather than of limitation.

Obviously, many modifications and variations of the present disclosure are possible in light of the above teachings. It is, therefore, to be understood that within the scope of the appended claims, wherein reference numerals are merely for illustrative purposes and convenience and are not in any way limiting, the present apparatus and method, which is defined by the following claims as interpreted according to the principles of patent law, including the Doctrine of Equivalents, may be practiced otherwise than is specifically described.

The invention claimed is:

1. A mechanism for retaining a work piece in a fixed orientation during a machining process on diversely positioned surfaces falling on multiple work piece axes, the mechanism comprising:
   a body portion having an upper surface with an elongated V-shaped groove formed therein, a planar lower surface spaced from said upper surface, and a through passage extending between said upper and lower surfaces; and
   a fastener portion including an elongated shaft disposed within said through passage, said elongated shaft having an upper end emerging within said V-shaped groove to engage a work piece aligned therewith and a lower end extending below and to abut said lower surface and to maintain said elongated shaft under tensile loading, the body portion including a longitudinal opening externally exposing an adjustable abutment feature carried on the lower end of said elongated shaft, the longitudinal opening including an open first end and at an open second end, the second end being opposite to and substantially aligned with the first end, the body portion including a first external face and a second external face, the first end opening to the first external face, the second end opening the second external face, the adjustable abutment feature being accessible for adjustment through the open first end or the open second end, whereby the tensile loading of said elongated shaft can be varied insitu using a tool inserted into the open first end or the open second end.

2. The mechanism of claim 1, wherein a work piece is configured in at least one of the following ways:
   (a) asymmetrically along at least one principle axis,
   (b) asymmetrically along at least two principal axes, and
   (c) asymmetrically along three principal axes.

3. The mechanism of claim 1, wherein said work piece is elongated along one principle axis.

4. The mechanism of claim 1, wherein said V-shaped groove has a line of elongation disposed substantially parallel to said lower surface.

5. The mechanism of claim 1, wherein said V-shaped groove comprises first and second obliquely angled complimentary planar surfaces.

6. The mechanism of claim 5, wherein said V-shaped groove further comprises an elongated recess formed at a nadir of said first and second obliquely angled complimentary planar surfaces.

7. The mechanism of claim 6, wherein the elongated shaft of said fastener portion emerges upwardly from said through passage along an axis normally aligned with said nadir.

8. The mechanism of claim 1, wherein said body portion comprises a single homogenous construct.

9. The mechanism of claim 1, wherein said body portion and said fastener portion are formed of tool steel.

10. The mechanism of claim 1, wherein said body portion comprises at least one longitudinally extending foot forming a mounting surface disposed opposite said upper surface.

11. The mechanism of claim 10, wherein said foot forms a vertical opening to receive a fastener for mounting said mechanism to a planar machining table.

12. The mechanism of claim 11, wherein said vertical opening is longitudinally and/or laterally elongated to enable selective repositioning and re-mounting of said mechanism vis-à-vis said planar machining table.

13. The mechanism of claim 1, wherein said through passage is configured to effect a slip-fit of said elongated shaft there through.

14. The mechanism of claim 1, wherein said body portion comprises at least one blind bore formed in a side wall thereof to releasably engage a lift-point attachment.

15. The mechanism of claim 1, wherein said adjustable abutment feature comprises a threaded fastener.

16. A mechanism for retaining an elongated work piece in a fixed orientation during a machining process on diversely positioned surfaces falling on multiple work piece axes, said mechanism comprising:
a plurality of discrete body portions, each body portion having an upper surface with an elongated V-shaped groove formed therein, a planar lower surface spaced from said upper surface, and a through passage extending between said upper and lower surfaces;
a plurality of discrete fastener portions, wherein at least one of said plurality of discrete fastener portions is associated with each of said body portions, each fastener portion including an elongated shaft disposed within an associated through passage, said elongated shaft having an upper end emerging within said V-shaped groove and configured to engage a work piece aligned therewith and a lower end extending below and to abut said lower surface and to maintain said elongated shaft under tensile loading,
at least one body portion including a longitudinal opening externally exposing an adjustable abutment feature carried on the lower end of said elongated shaft, the longitudinal opening including an open first end and at an open second end, the second end being opposite to and substantially aligned with the first end, the body portion including a first external face and a second external face, the first end opening to the first external face, the second end opening the second external face, the adjustable abutment feature being accessible for adjustment through the open first end or the open second end, whereby the tensile loading of said elongated shaft can be varied insitu using a tool inserted into the open first end or the open second end; and
a planar machining table for adjustably securing each of said plurality of said body portions in a spaced-apart relationship wherein the V-shaped groove of said plurality of discrete body portions are in axial alignment.

17. A method for retaining a work piece in a fixed orientation during a machining process on diversely positioned surfaces falling on multiple work piece axes, said method comprising the steps of:
providing a body portion of a V-block fixture having an upper surface with an elongated V-shaped groove formed therein, a planar lower surface spaced from said upper surface, and a through passage extending between said upper and lower surfaces, and a longitudinal opening including an open first end and at an open second end, the second end being opposite to and substantially aligned with the first end, the body portion including a first external face and a second external face, the first end opening to the first external face, the second end opening the second external face;
providing a fastener portion of a V-block fixture including an elongated shaft disposed within said through passage, said elongated shaft having an upper end emerging within said V-shaped groove and configured to engage a work piece aligned therewith and a lower end extending below and configured to abut said lower surface and to maintain said elongated shaft under tensile loading;
providing a work piece with an outwardly opening recess formed therein;
aligning said work piece with said V-shaped groove;
aligning said outwardly opening recess with the upper end of said elongated shaft; and
extending the upper end of said elongated shaft within said outwardly opening recess to engage said work piece and to establish tensile loading of said shaft, the longitudinal opening externally exposing an adjustable abutment feature carried on the lower end of said elongated shaft, the adjustable abutment feature being accessible for adjustment through the open first end or the open second end, whereby the tensile loading of said elongated shaft can be varied insitu using a tool inserted into the open first end or the open second end.

18. The method of claim 17, further including forming a threaded blind bore in an outer surface of said work piece.

19. The method of claim 17, wherein extending the upper end of said elongated shaft within said outwardly opening recess to engage said work piece and to establish tensile loading of said shaft includes threadably advancing said elongated shaft within said recess to affect said tensile loading.

20. The mechanism of claim 1, wherein at least one of the first end or the second end of the longitudinal opening transitions to the respective first external face or the second external face by a bevel is beveled.

21. The mechanism of claim 16, wherein at least one blind bore is formed in a side wall of the body portion to releasably engage a lift-point attachment, and wherein the blind bore extends substantially perpendicular to the through passage.

22. The method of claim 17, wherein the work piece is asymmetric along at least two principal axes.

* * * * *

UNITED STATES PATENT AND TRADEMARK OFFICE
CERTIFICATE OF CORRECTION

PATENT NO. : 9,789,575 B2
APPLICATION NO. : 14/448690
DATED : October 17, 2017
INVENTOR(S) : Carl E. Scarbrough, Jr.

It is certified that error appears in the above-identified patent and that said Letters Patent is hereby corrected as shown below:

In the Claims

Claim 17, Column 10, Line 14: delete "and"
Claim 20, Column 10, Line 56: delete "is beveled"

Signed and Sealed this
Twelfth Day of December, 2017

Joseph Matal
*Performing the Functions and Duties of the
Under Secretary of Commerce for Intellectual Property and
Director of the United States Patent and Trademark Office*